US012584230B2

(12) United States Patent (10) Patent No.: US 12,584,230 B2
Tang et al. (45) Date of Patent: Mar. 24, 2026

(54) ELECTROLYTIC RECYCLING SYSTEM OF WASTE PHOSPHOGYPSUM AND METHOD

(71) Applicants: Joshua Jun-Ren Tang, Gaithersburg, MD (US); Alex Wang, Gaithersburg, MD (US)

(72) Inventors: Joshua Jun-Ren Tang, Gaithersburg, MD (US); Alex Wang, Gaithersburg, MD (US)

( * ) Notice: Subject to any disclaimer, the term of this patent is extended or adjusted under 35 U.S.C. 154(b) by 0 days.

(21) Appl. No.: 19/007,632

(22) Filed: Jan. 2, 2025

(65) Prior Publication Data

US 2025/0215579 A1 Jul. 3, 2025

Related U.S. Application Data

(60) Provisional application No. 63/616,851, filed on Jan. 2, 2024.

(51) Int. Cl.
*C25B 1/22* (2006.01)
*C01D 5/00* (2006.01)
(Continued)

(52) U.S. Cl.
CPC ................. *C25B 1/22* (2013.01); *C01D 5/00* (2013.01); *C25B 9/21* (2021.01); *C25B 11/046* (2021.01);
(Continued)

(58) Field of Classification Search
CPC ........... C25B 1/22; C25B 9/21; C25B 11/046; C25B 11/047; C25B 15/029; C25B 15/083; C25B 15/085; C01D 5/00
See application file for complete search history.

(56) References Cited

U.S. PATENT DOCUMENTS

| 3,394,068 A | * | 7/1968 | Calmon | ................. B01D 61/44 |
| | | | | 204/539 |
| 2009/0145770 A1 | * | 6/2009 | Sims | ........................ C25B 15/08 |
| | | | | 204/240 |

(Continued)

FOREIGN PATENT DOCUMENTS

| CN | 103232052 A | * | 8/2013 | |
| CN | 106115742 A | * | 11/2016 | ............... C01D 1/04 |

(Continued)

OTHER PUBLICATIONS

Wei, Jucai, et al. "A zero-emission method for recycling phosphogypsum using Na₂SO₄ electrolysis: Preliminary study." *Separation and Purification Technology* 259 (2021): 118168, Elsevier, downloaded Mar. 15, 2025 from https://doi.org/10.1016/j.seppur.2020.118168.

*Primary Examiner* — Luan V Van
*Assistant Examiner* — Mofoluwaso S Jebutu
(74) *Attorney, Agent, or Firm* — U. Maryland Carey School of Law

(57) ABSTRACT

A chemical process utilizing electrodialysis in a flow cell with cation and anion selective ion exchange membranes to produce sulfuric acid from phosphogypsum and gypsum, and centrifugal separation to reduce radioactive phosphogypsum into a liquid slurry (mainly calcium hydroxide) capable of sequestration. Reactants used are water, phosphogypsum or gypsum, and sodium carbonate.

10 Claims, 2 Drawing Sheets

(51) Int. Cl.

| | | |
|---|---|---|
| *C25B 9/21* | (2021.01) | |
| *C25B 11/046* | (2021.01) | |
| *C25B 11/047* | (2021.01) | |
| *C25B 15/029* | (2021.01) | |
| *C25B 15/08* | (2006.01) | |

(52) U.S. Cl.
CPC .......... *C25B 11/047* (2021.01); *C25B 15/029* (2021.01); *C25B 15/083* (2021.01); *C25B 15/085* (2021.01)

(56)  References Cited

U.S. PATENT DOCUMENTS

| | | | |
|---|---|---|---|
| 2014/0010743 A1* | 1/2014 | Kosmoski | ................. C25B 1/14 |
| | | | 205/349 |
| 2019/0263668 A1 | 8/2019 | Khaless et al. | |
| 2024/0149240 A1 | 5/2024 | Lammers | |

FOREIGN PATENT DOCUMENTS

| | | | | |
|---|---|---|---|---|
| CN | 106865555 A | * | 6/2017 | ........... B01D 61/422 |
| CN | 111364055 A | * | 7/2020 | .............. C25B 9/73 |
| CN | 111364055 B | | 4/2021 | |
| CN | 117003205 A | | 11/2023 | |
| CN | 117552043 A | | 2/2024 | |
| WO | WO-2024064061 A1 | * | 3/2024 | .............. C22B 3/42 |

* cited by examiner

ELECTROLYTIC RECYCLING SYSTEM OF WASTE PHOSPHOGYPSUM AND METHOD

CROSS REFERENCE TO RELATED APPLICATION

This application claims the benefit of U.S. application Ser. No. 63/616,851, filed Jan. 2, 2024, the contents of which are hereby incorporated by reference.

RELATED ART

Previous inventions have identified or used sodium sulfate electrolysis in a device or method for breaking down phosphogypsum using a single anion or cation exchange membrane, a nanofiltration membrane, or functioning without a membrane. The present invention improves upon previous methods by adding a neutral chamber to facilitate the flow of sodium sulfate, gravity-assisted collection of precipitate, and a design and method to facilitate replacement of ion exchange membranes and electrodes.

BACKGROUND OF THE INVENTION

Sulfuric acid ($H_2SO_4$) has many industrial applications but is often wasted or recovered through expensive and inefficient methods, generally dangerous to the environment. In the agrochemical industry, this waste is found in phosphogypsum (gypsum [$CaSO_4$] with radioactive impurities) which is stored in large stacks due to EPA regulations concerning its usage because of its partial radioactivity. These stacks are a growing problem in Florida, now exceeding levels of accumulation more than 1 billion tons, posing indisputable risks towards nearby water supplies when placed near sinkhole-prone land. Although it still contains sulfate, it cannot be reconverted back into sulfuric acid due to radioactive contaminants (isotopes like calcium) infiltrating through any current means of isolation.

Embodiments of the present invention may not only isolate mostly pure sulfuric acid from gypsum and phosphogypsum and recycle the sulfuric acid for future use, but also simultaneously transform contaminated phosphogypsum into a calcium hydroxide slurry, which can be sequestered underground. In one embodiment, this is done through using sodium sulfate produced from calcium sulfate in a catalytic cycle, up to a process involving selective ion exchange separation(electrodialysis), dissociating into sulfate, and finally converting into sulfuric acid while releasing pure oxygen and hydrogen byproducts, along with calcium hydroxide when applied to pure gypsum.

SUMMARY OF THE INVENTION

Embodiments of the invention provide a system and method for breaking down phosphogypsum waste and recovering sulfuric acid, sodium hydroxide, sodium sulfate, and oxygen and hydrogen gas, while enabling the sequestration of potentially toxic precipitate waste. The phosphogypsum waste processing system uses sodium sulfate obtained by reacting phosphogypsum with sodium hydroxide and removing the precipitate and heavy metal ingredients using a centrifugal separation chamber. The sodium sulfate circulates through a 3-chamber electrolysis flow cell, with a central neutral chamber in communication with a sodium sulfate cycling pump, between an anion exchange membrane and a cation exchange membrane mounted on attachment grids on either side of the neutral chamber. The anode and cathode exchange membranes are enclosed by removable electrode plates, which are capable of housing an anode or cathode. When installed around an ion exchange membrane, each plate forms a small chamber around the membrane, with two fluid ports in communication with the neutral chamber across the membrane. The plate enclosing the anion exchange membrane may be fitted with an iridium tantalum or iridium ruthenium anode to create an anode chamber; the plate enclosing the cation exchange membrane may be fitted with a graphite or nickel cathode to create a cathode chamber. Ports in the electrode plates allow intermittent removal of acid or base products and enable the maintenance of pH gradients that maximize reaction efficiency.

The phosphogypsum waste processing method entails grinding phosphogypsum into a powder, mixing it with sodium hydroxide at temperatures of at least 60 C to produce aqueous sodium sulfate and precipitate calcium hydroxide and heavy impurities, which are centrifugally separated and sequestered. The sodium sulfate may be stored in a cycling tank and is recycled within the system by pumping through the sodium sulfate through the flow cell neutral chamber. The neutral chamber may be vertically aligned so that the ion membranes are above the sodium sulfate pump ports, and so that the sodium sulfate intake port is above the sodium sulfate outflow port. Circulating the sodium sulfate in this manner gravity-assisted collection and removal of precipitate in the base of the chamber and protects the ion exchange membranes from physical contaminants. Sodium sulfate is collected from the phosphogypsum breakdown chemical reactions for storage or recycling; oxygen gas and sulfuric acid are collected from the anode chamber (the sulfuric acid may be washed to increase purity); hydrogen gas and sodium hydroxide are collected from the cathode chamber (sodium hydroxide may be recycled into the phosphogypsum reaction chamber with an intermittent pump).

In some aspects, the techniques described herein relate to a method for sulfuric acid production from phosphogypsum including steps of: (a) grinding phosphogypsum into a powdered gypsum; mixing the powdered gypsum with sodium hydroxide solution in a phosphogypsum reaction chamber while maintaining temperatures of at least 60 C to induce the reaction of sodium hydroxide (NaOH) with calcium sulfate dihydrate ($CaSO4+2H2O$), producing aqueous sodium sulfate ($Na2SO4$) while precipitating calcium hydroxide and heavy impurities; separating precipitated impurities from the sodium sulfate in a centrifugal separator; initially introducing sodium carbonate as a source of sodium hydroxide; pumping sodium hydroxide from a cathode chamber of an electrodialysis cell to the phosphogypsum reaction chamber using a first intermittent fluid pump; (b) centrifugally separating remaining aqueous sodium sulfate solution from precipitated calcium hydroxide and heavy impurities as a liquid slurry for underground sequestration; (c) pumping the remaining aqueous sodium sulfate solution into a sodium sulfate cycling tank using a sodium sulfate cycling pump; (d) pumping the remaining aqueous sodium sulfate solution through an electrodialysis chamber including: (i) an electrically neutral central chamber configured to receive sodium sulfate from the sodium sulfate cycling pump; (ii) a cathode chamber housing a cathode that is separated from the central chamber by a cation exchange membrane fastened to a first attachment grid; (iii) an intermittent pump to transfer aliquots of sodium hydroxide from the cathode chamber to the phosphogypsum reaction chamber, with a distal one-way fluid valve to prevent backflow; (iv) an anode chamber housing an anode separated from the central chamber by an anion exchange membrane fastened to a second attachment grid; (v) a sulfuric acid cycling pump used to maintain an ideal gradient for sulfuric acid production within the anode chamber, with a distal one-way fluid valve to prevent backflow; (e) applying an electrical current to the cathode and anode to create an electric field and energize ionic migration across the anion exchange membrane to generate oxygen gas and sulfuric acid in the anode chamber and across the cation exchange membrane to generate hydrogen gas and sodium hydroxide in the cathode chamber; (f) collecting concentrated sulfuric acid from the anode chamber once concentration reaches 11% w/w; (g) distilling the concentrated sulfuric acid to a concentration of approximately 97%; (h) recycling sodium hydroxide from the cathode chamber to the phosphogypsum reaction chamber for reaction with ground phosphogypsum (CaSO4) at above 60 C producing sodium sulfate solution and precipitating calcium hydroxide and heavy impurities; (i) collecting oxygen gas from the anode chamber and hydrogen gas from the cathode chamber.

In some aspects, the techniques described herein relate to a method wherein the cathode is included of nickel and the anode is included of iridium ruthenium oxide. In some aspects, the techniques described herein relate to a method wherein the cathode is included of graphite and the anode is included of iridium tantalum oxide.

In some aspects, the techniques described herein relate to a phosphogypsum waste processing system for breaking down phosphogypsum waste and recovering sulfuric acid, including: (a) a three-chamber electrolysis flow cell including a neutral chamber formed by a base component contiguous with a main body component, an anode chamber adjacent to one side of the neutral chamber main body component and containing an iridium-ruthenium oxide anode, a cathode chamber adjacent to an opposite side of the neutral chamber main body component and containing a graphite or nickel cathode, an anion exchange membrane attached to an attachment grid separating the neutral chamber from the anode chamber, a cathode exchange membrane fastened to an attachment grid interposed between the neutral chamber and the cathode chamber; (b) a phosphogypsum reaction chamber configured to receive ground phosphogypsum and sodium hydroxide at temperatures above 60 C, in fluid communication with the neutral chamber via a sodium sulfate cycling pump and in further fluid communication with a centrifugal separator; (c) a distal one-way fluid valve interposed between the sodium sulfate cycling pump and the neutral chamber to prevent back-flow to phosphogypsum reaction chamber; (d) a first vacuum pump in fluid communication with the anode chamber, configured to collect oxygen and hydrogen gas therefrom; (e) a first intermittent fluid pump interposed in fluid communication between the anode chamber and an acid solution tank, configured to circulate sulfuric acid solution through the anode chamber and acid solution tank; (f) an acid drain valve in fluid communication with the acid solution tank, configured to permit collection of sulfuric acid solution from the acid solution tank once a concentration of sulfuric acid solution reaches 11% w/w; (g) a second vacuum pump in fluid communication with the cathode chamber configured to collect oxygen and hydrogen gas therefrom; (h) a second intermittent fluid pump interposed in fluid communication between the cathode chamber and a sodium hydroxide tank, configured to circulate sodium hydroxide through the cathode chamber and sodium hydroxide tank; (i) a second one-way distal fluid valve in fluid communication with the sodium hydroxide tank and configured to prevent backflow of sodium hydroxide while allowing introduction of sodium hydroxide to the phosphogypsum reaction chamber at intervals calibrated to maintain optimal reaction concentrations without contamination; (j) wherein the centrifugal separator is configured to separate calcium hydroxide, calcium phosphate, and toxic or radioactive impurities from reacted phosphogypsum as a liquid slurry.

In some aspects, there is a system for recycling of phosphogypsum, the system including: an electrodialysis unit having: a neutral compartment including a slurry chamber and a central chamber disposed above the slurry chamber, the slurry chamber in fluid communication with the central chamber and having a filter disposed therebetween to limit calcium hydroxide flow; an anolyte chamber adjacent to the central chamber and separated therefrom by an anion-exchange membrane, the anolyte chamber including an anode configured to be connectable to an external electrical current source, a catholyte chamber adjacent to the central chamber and separated therefrom by a cation-exchange membrane, the catholyte chamber including a cathode configured to be connectable to an external electrical current source; a sulfuric acid flow unit in fluid communication with the catholyte chamber, configured to cause dilute sulfuric acid to flow through the catholyte chamber; a sodium sulfate flow unit in fluid communication with the central chamber, configured to cause sodium sulfate to flow through the central chamber; a sodium hydroxide flow unit in fluid communication with the anolyte chamber, configured to cause sodium hydroxide to flow through the anolyte chamber; a slurry reactor unit configured to react phosphogypsum with sodium hydroxide to produce a slurry of calcium hydroxide and sodium sulfate; and a slurry flow unit in fluid communication with the slurry chamber and slurry reactor unit, configured to cause the slurry to flow through the slurry chamber; whereby the filter permits sodium sulfate to flow from the slurry chamber into the central chamber and whereby, when an electrical current is applied to the anode and cathode, the electrodialysis unit is configured to cause an ion flow through the anion-exchange membrane to produce sulfuric acid and oxygen in the anolyte chamber and an ion flow through the cation-exchange membrane to produce sodium hydroxide and hydrogen in the catholyte chamber.

In some aspects of the system, the cathode includes nickel. In some aspects of the system, the anode includes a metal oxide of iridium-ruthenium, iridium-tantalum mixed metal oxide, or platinum. In some aspects of the system, the sulfuric acid flow unit includes a dilute sulfuric acid tank and pump attachable to a water supply and configured to maintain a concentration range of the dilute sulfuric acid.

In some aspects, the system further includes a distiller in fluid communication with the sulfuric acid flow unit, the distiller configured to distill the dilute sulfuric acid to a high concentration sulfuric acid. In some aspects of the system, the sodium hydroxide flow unit is in further fluid communication with the slurry reactor unit and configured to provide sodium hydroxide thereto. In some aspects, the system further includes a phosphogypsum crushing unit, configured to provide the phosphogypsum in crushed form to the slurry reactor unit.

In some aspects, the system further includes: an oxygen port disposed atop the anolyte chamber, configured to allow oxygen to be vented or collected from the anolyte chamber; and a hydrogen port disposed atop the catholyte chamber, configured to allow hydrogen to be vented or collected from the catholyte chamber. In some aspects of the system, the filter includes at least one component selected from the group consisting of meltblown polypropylene, polyethylene, polyester, and cellulose.

In some aspects, the techniques described herein relate to a system further including: an oxygen port disposed atop the anolyte chamber, configured to allow oxygen to be vented or collected from the anolyte chamber; a hydrogen port disposed atop the catholyte chamber, configured to allow hydrogen to be vented or collected from the catholyte chamber; a phosphogypsum crushing unit, configured to provide the phosphogypsum in crushed form to the slurry reactor unit; and a distiller in fluid communication with the sulfuric acid flow unit, said distiller configured to distill the dilute sulfuric acid to a high concentration sulfuric acid; wherein the cathode includes nickel; wherein the anode includes a metal oxide of iridium-ruthenium; wherein the sulfuric acid flow unit includes a dilute sulfuric acid tank and pump attachable to a water supply and configured to maintain a concentration range of the dilute sulfuric acid; and wherein the sodium hydroxide flow unit is in further fluid communication with the slurry reactor unit and configured to provide sodium hydroxide thereto.

DETAILED DESCRIPTION OF THE INVENTION

Figure 1:
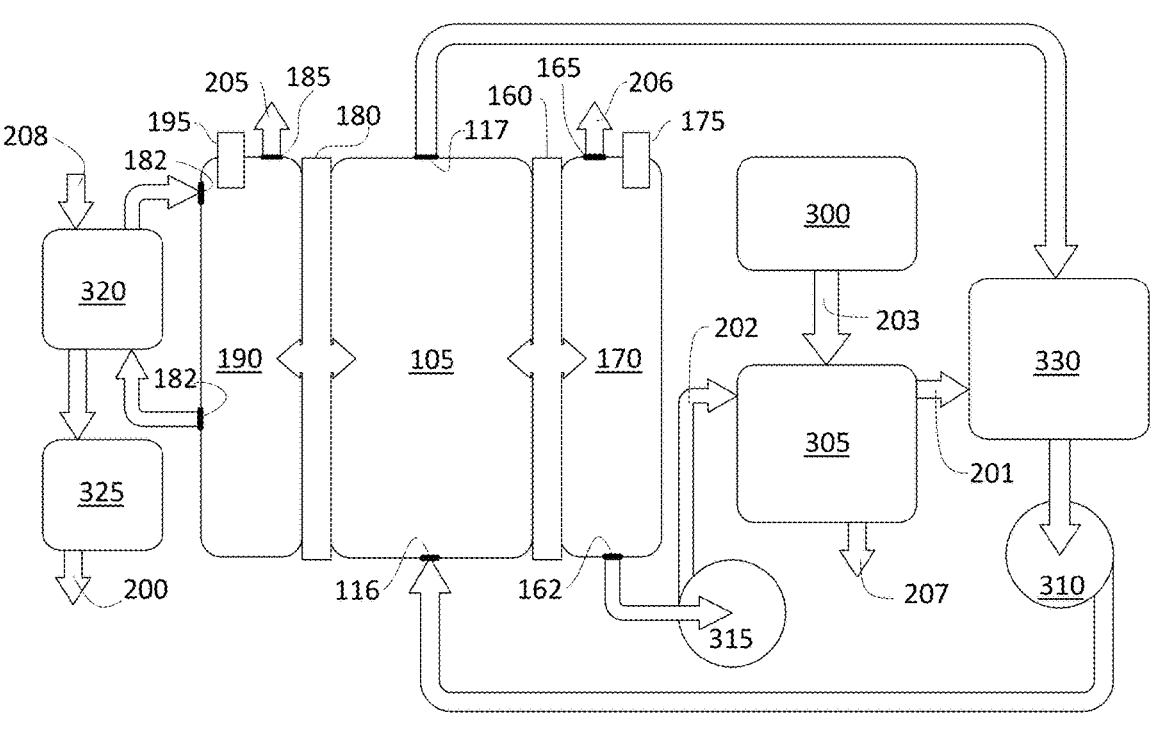
FIG. 1 illustrates a phosphogypsum waste processing system in accordance with an embodiment of the invention.

With reference to FIG. 1, gypsum rock may be ground to a powder in phosphogypsum pulverizing chamber 300, producing powdered phosphogypsum 203 which then may be reacted with sodium carbonate or sodium hydroxide in centrifuge reaction chamber 305 to produce highly soluble sodium sulfate 201. Waste calcium hydroxide byproduct exits the system at flow 207. The sodium sulfate 201 from the centrifugal separator is cycled through a three-chamber electrolysis flow cell 100, consisting of an anode compartment 190, neutral middle compartment 105, and a cathode compartment 170. The middle compartment 105 is charged with an aqueous sodium sulfate solution 201, between an anion-exchange membrane 180 (separating the middle compartment 105 from the anode chamber 190), and a cation-exchange membrane 160 (separating the middle compartment 105 from the cathode chamber 170). This allows the production of sulfuric acid 200 and sodium hydroxide 202 via electrodialysis simultaneously, of reasonable purity without sodium sulfate contamination (another problem for commercial attempts of this method, which was performed before the mass usage of selective ion-exchange membranes). In one embodiment, removable chambers 170 and 190 may facilitate replacement of the electrodes 175 and 195 and ion exchange membranes 160 and 180.

In one embodiment, cathode 175 comprises nickel; in another embodiment, cathode 175 comprises graphite. In one embodiment, anode 195 comprises iridium-tantalum oxide; in another embodiment, anode 195 comprises iridium-ruthenium, which will prevent electrochemical oxidation of the anode in the highly acidic and oxidizing conditions within the anode chamber. A graphite cathode can minimize corrosion problems and can be inexpensive.

The mechanism of operation of this cell is described as such: sodium sulfate 201 is placed in the middle neutral chamber 105 where it dissolves, or aqueous sodium sulfate is pumped into the chamber. Sulfate anions in the middle neutral cell 105 are electrostatically attracted to the anode 195, and sodium cations in the middle cell are attracted to the cathode 175. The two ion-exchange membranes 160 and 180 ensure that no sodium hydroxide contamination is observed in the sulfuric acid. Thus, as time passes, the anode chamber will slowly become acidic and the cathode chamber will slowly become basic.

Produced sodium hydroxide 202 is then drained off and reacted with the phosphogypsum slurry using an intermittent sodium hydroxide pump 315 and one-way fluid valve. The intermittent sodium hydroxide pump 315 is scheduled at intervals calibrated to maintain optimal reaction conditions without producing reactions between sodium hydroxide and sodium sulfate. At temperatures above 60 C, the reaction of sodium hydroxide 202 and phosphogypsum produces calcium hydroxide precipitate and sodium sulfate solution 201. Additionally, any heavy metal/radioactive sulfates and phosphates in the phosphogypsum are then precipitated with the calcium hydroxide and can be extracted via centrifugal separation 305 and stored underground 207, as they are now in a liquidated form, making them possible to pump underground and sequester. The produced sodium sulfate 201 is then recycled back into the cell via sodium sulfate tank 330 using a sodium sulfate cycling pump 310.

In this method, the sodium ions serve as a shuttle for the sulfate ions, by solubilizing cheap but barely soluble calcium sulfate into sodium sulfate, which minimizes costs. Additionally, the use of two ion-exchange membranes maximizes efficiency by preventing the backflow of hydroxide ions into the anode chamber where acid is produced, reducing electricity costs. Furthermore, as a byproduct, water will also be electrolyzed at both anode and cathode, producing the valuable gasses oxygen 205 and hydrogen 206, which can be bottled using collection containers attached to the electrolysis cell hydrogen gas port 165 and oxygen gas port 185 to be sold as byproducts.

This process produces four valuable products (sulfuric acid, oxygen, hydrogen, and sodium hydroxide) from only an input of phosphogypsum, a small amount of sodium carbonate, and electricity, which can be produced from solar panels or other sources of green energy. Additionally, unlike the contact process of producing sulfuric acid, this method does not require sulfur dioxide gas emissions, which are a major health pollutant, or elemental sulfur reformed from coal and natural gas smoke and other fossil fuels. The cost required to start up this cell is also minimal, with most of the cost being in the electrodes and membranes, which are just required to start up and are resistant to deterioration. Elemental sulfur is around 350 USD/ton, much more expensive than gypsum at only 12 USO/ton, which shows the economic viability of this process as well. Thus, this process has both economic and environmental advantages over the traditional contact process.

Figure 2:
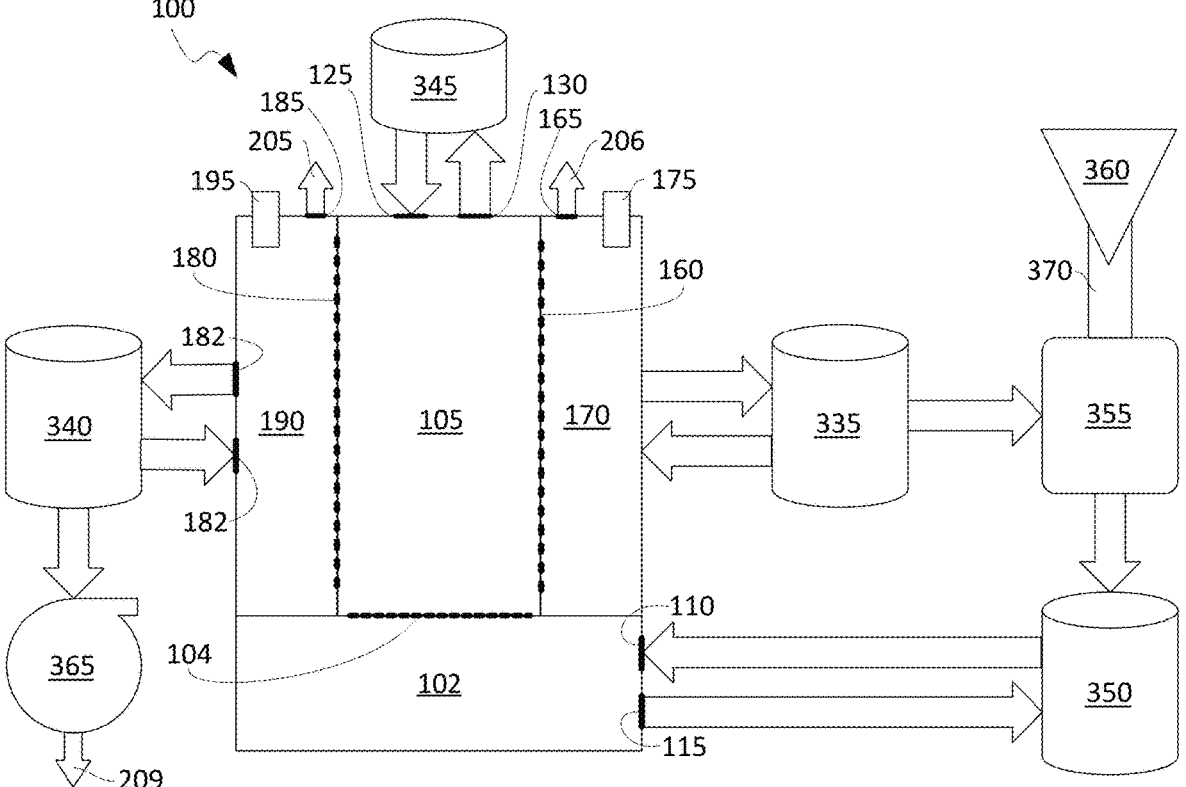
FIG. 2 illustrates a phosphogypsum waste processing system in accordance with another embodiment of the invention.
Figure 3A:
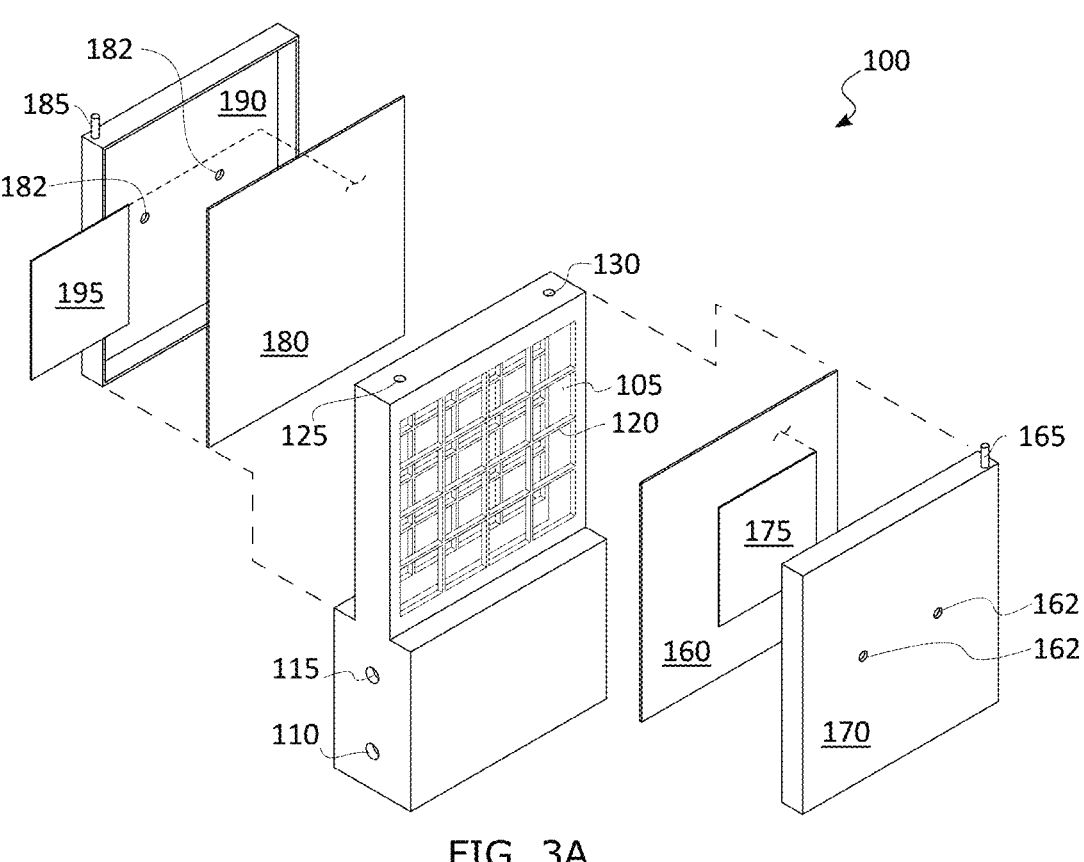
FIGS. 3A and 3B show an exploded isometric view and an isometric view, respectively, of an exemplary electrolysis cell in accordance with an embodiment of the invention.
Figure 3B:
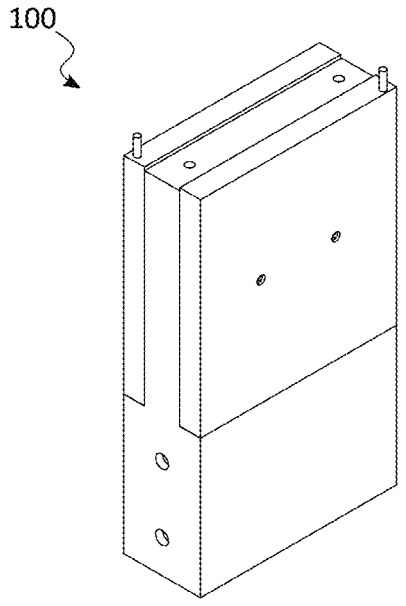

Another embodiment is contemplated with reference to FIGS. 2, 3A, and 3B. A neutral compartment of electrolysis cell 100 may comprise a slurry chamber 102 and an electrolysis cell neutral chamber 105, in between which there may be filter sheet 104. In some embodiments, filter 104 comprises meltblown polypropylene. In some embodiments, filter 104 comprises polyethylene, polyester, or cellulose. Filter 104 may function to inhibit calcium hydroxide from entering electrolysis cell neutral chamber 105. Ground phosphogypsum is first mixed with NaOH in slurry reactor unit 355 to obtain a solution of soluble sodium sulfate in an insoluble calcium hydroxide slurry which is then added to the slurry chamber 102 through port 110 via slurry flow unit 350.

This mixture of phosphogypsum slurry mixed in NaOH solution reacts to form sodium sulfate, which stays in solution, and calcium hydroxide, which is observed to form in a paste-like consistency that easily settles out and by tuning the flow rate, can be ensured to stay slurry chamber 102 in order to not accumulate on membranes 160 and 180. Sodium sulfate, being soluble, diffuses into the top compartment of the cell through the filter sheet 104, and is pumped out via port 130 to another tank holding previous sodium sulfate solution. This is then pumped back into port 125 to ensure consistent flow of sodium sulfate across the membranes using sodium sulfate flow unit 345. As electrolysis runs, sodium hydroxide 202 accumulates in the cathode chamber 170 with cation-exchange membrane 160. Flow in the cathode chamber may be maintained with sodium hydroxide flow unit 335. This sodium hydroxide is then fully reused to react with further phosphogypsum. Simultaneously, sulfuric acid is produced in the anode chamber 195, pumped into a separate sulfuric acid tank and pumped back in through ports 182 using sulfuric acid flow unit 340.

When the density of the calcium hydroxide and sodium sulfate slurry in the tank exceeds a certain limit corresponding to a large amount of insoluble calcium hydroxide solids in the slurry, the slurry (which also contains all heavy metals precipitated out as their hydroxides) is pumped underground and disposed of in liquid form.

Sodium sulfate in neutral chamber 105 is electrolyzed with the two membranes as previously described. Hydrogen gas 206 is produced at cathode 175, and oxygen gas 205 is produced at anode 195. Sodium ions are drawn through cation-exchange membrane 160 into the cathode chamber 170, where the cathode 175 turns them into sodium hydroxide, which is then mixed with ground phosphogypsum again.

On the other hand, sulfate ions may accumulate in anode chamber 190. When sulfuric acid concentration in the sulfuric acid exceeds a certain percent, also measured with density, some of the solution is drained and distilled in a still 365, which accumulates in a separate chamber of highly concentrated acid. Water may then added to replace the lost solution.

Description of the Reference Numerals:

100 electrolysis cell
102 slurry chamber
104 filter
105 electrolysis cell neutral chamber
110 calcium hydroxide slurry intake port
115 calcium hydroxide slurry outflow port
116 sodium sulfate intake port
117 sodium sulfate outflow port
120 ion exchange membrane attachment grid
125 neutral chamber sodium sulfate intake port
130 neutral chamber sodium sulfate outflow port
160 cation-exchange membrane
162 cathode chamber port
165 hydrogen port
170 catholyte chamber
175 cathode
180 anion-exchange membrane 182 anode chamber port
185 oxygen port
190 anolyte chamber
195 anode
200 sulfuric acid collection
201 sodium sulfate
202 sodium hydroxide
203 sodium sulfate contaminated with heavy metal slurry
205 oxygen
206 hydrogen
207 to storage/underground
208 water
209 concentrated sulfuric acid
300 phosphogypsum pulverizing chamber
305 centrifugal reaction chamber
310 sodium sulfate circulating pump
315 sodium hydroxide pump
320 dilute sulfuric acid tank
325 sulfuric acid distiller
330 sodium sulfate tank
335 sodium hydroxide flow unit
340 sulfuric acid flow unit
345 sodium sulfate flow unit
350 slurry flow unit
355 slurry reactor unit
360 phosphogypsum supply
365 distiller
370 water, crushed phosphogypsum processing

What is claimed is:

1. A system for recycling of phosphogypsum, the system comprising:

an electrodialysis unit having:

a neutral compartment including a slurry chamber and a central chamber disposed above the slurry chamber, the slurry chamber in fluid communication with the central chamber and having a filter disposed therebetween to limit calcium hydroxide flow;

an anolyte chamber adjacent to the central chamber and separated therefrom by an anion-exchange membrane, the anolyte chamber including an anode configured to be connectable to an external electrical current source, a catholyte chamber adjacent to the central chamber and separated therefrom by a cation-exchange membrane, the catholyte chamber including a cathode configured to be connectable to an external electrical current source;

a sulfuric acid flow unit in fluid communication with the anolyte chamber, configured to cause dilute sulfuric acid to flow through the anolyte chamber;

a sodium sulfate flow unit in fluid communication with the central chamber, configured to cause sodium sulfate to flow through the central chamber;

a sodium hydroxide flow unit in fluid communication with the catholyte chamber, configured to cause sodium hydroxide to flow through the catholyte chamber;

a slurry reactor unit configured to react phosphogypsum with sodium hydroxide to produce a slurry of calcium hydroxide and sodium sulfate; and a slurry flow unit in fluid communication with the slurry chamber and slurry reactor unit, configured to cause the slurry to flow through the slurry chamber;

whereby the filter permits sodium sulfate to flow from the slurry chamber into the central chamber and whereby, when an electrical current is applied to the anode and cathode, the electrodialysis unit is configured to cause an ion flow through the anion-exchange membrane to produce sulfuric acid and oxygen in the anolyte chamber and an ion flow through the cation-exchange membrane to produce sodium hydroxide and hydrogen in the catholyte chamber.

2. The system of claim 1, wherein the cathode comprises nickel.

3. The system of claim 1, wherein the anode comprises a metal oxide of iridium-ruthenium, iridium-tantalum mixed metal oxide, or platinum.

4. The system of claim 1, wherein the sulfuric acid flow unit comprises a dilute sulfuric acid tank and pump attachable to a water supply and configured to maintain a concentration range of the dilute sulfuric acid.

5. The system of claim 4, further comprising a distiller in fluid communication with the sulfuric acid flow unit, said distiller configured to distill the dilute sulfuric acid to a high concentration sulfuric acid.

6. The system of claim 1, wherein the sodium hydroxide flow unit is in further fluid communication with the slurry reactor unit and configured to provide sodium hydroxide thereto.

7. The system of claim 1, further comprising a phosphogypsum crushing unit, configured to provide the phosphogypsum in crushed form to the slurry reactor unit.

8. The system of claim 1, further comprising:

an oxygen port disposed atop the anolyte chamber, configured to allow oxygen to be vented or collected from the anolyte chamber; and a hydrogen port disposed atop the catholyte chamber, configured to allow hydrogen to be vented or collected from the catholyte chamber.

9. The system of claim 1, wherein the filter comprises at least one component selected from the group consisting of meltblown polypropylene, polyethylene, and polyester.

10. The system of claim 1, further comprising:

an oxygen port disposed atop the anolyte chamber, configured to allow oxygen to be vented or collected from the anolyte chamber;

a hydrogen port disposed atop the catholyte chamber, configured to allow hydrogen to be vented or collected from the catholyte chamber;

a phosphogypsum crushing unit, configured to provide the phosphogypsum in crushed form to the slurry reactor unit; and a distiller in fluid communication with the sulfuric acid flow unit, said distiller configured to distill the dilute sulfuric acid to a high concentration sulfuric acid;

wherein the cathode comprises nickel;

wherein the anode comprises a metal oxide of iridium-ruthenium;

wherein the sulfuric acid flow unit comprises a dilute sulfuric acid tank and pump attachable to a water supply and configured to maintain a concentration range of the dilute sulfuric acid; and wherein the sodium hydroxide flow unit is in further fluid communication with the slurry reactor unit and configured to provide sodium hydroxide thereto.

\* \* \* \* \*